United States Patent [19]

Kramer

[11] 4,094,545
[45] June 13, 1978

[54] VEHICLE CAB STRUCTURE, ESPECIALLY FOR THE TRACTORS OF THE AGRICULTURAL OR CONSTRUCTION TYPE

[75] Inventor: Peter Kramer, Spich, Germany

[73] Assignee: Klöckner-Humboldt-Deutz Aktiengesellschaft, Cologne, Germany

[21] Appl. No.: 715,938

[22] Filed: Aug. 17, 1976

[30] Foreign Application Priority Data

Aug. 19, 1975 Germany .............................. 2536820

[51] Int. Cl.² .............................................. B60J 1/00
[52] U.S. Cl. .................. 296/28 C; 280/756; 296/35 R
[58] Field of Search ................... 296/35 R, 35 B, 102, 296/28 C; 280/150 C

[56] References Cited

U.S. PATENT DOCUMENTS

| 3,866,969 | 2/1975 | Sandrock | 296/28 C |
| 3,940,177 | 2/1976 | Miers et al. | 296/28 C |

*Primary Examiner*—Richard A. Bertsch
*Attorney, Agent, or Firm*—Walter Becker

[57] ABSTRACT

A vehicle cab structure, especially for tractors of the agricultural or construction type, in which a pair of laterally spaced side structures are provided formed of plates which are interconnected to make a rather rigid unit. The thus formed unit is reinforced near the rearward corners and has a lateral floor sheet at the bottom which is supported on the vehicle frame. The cab structure includes a roof with corner posts extending from the roof downwardly and engaging the forward and rearward outer corners of the aforementioned unit. Reinforcing is provided for the corners of the unit where the posts rest. Fenders for the tractor wheels may be mounted on the described unit.

19 Claims, 8 Drawing Figures

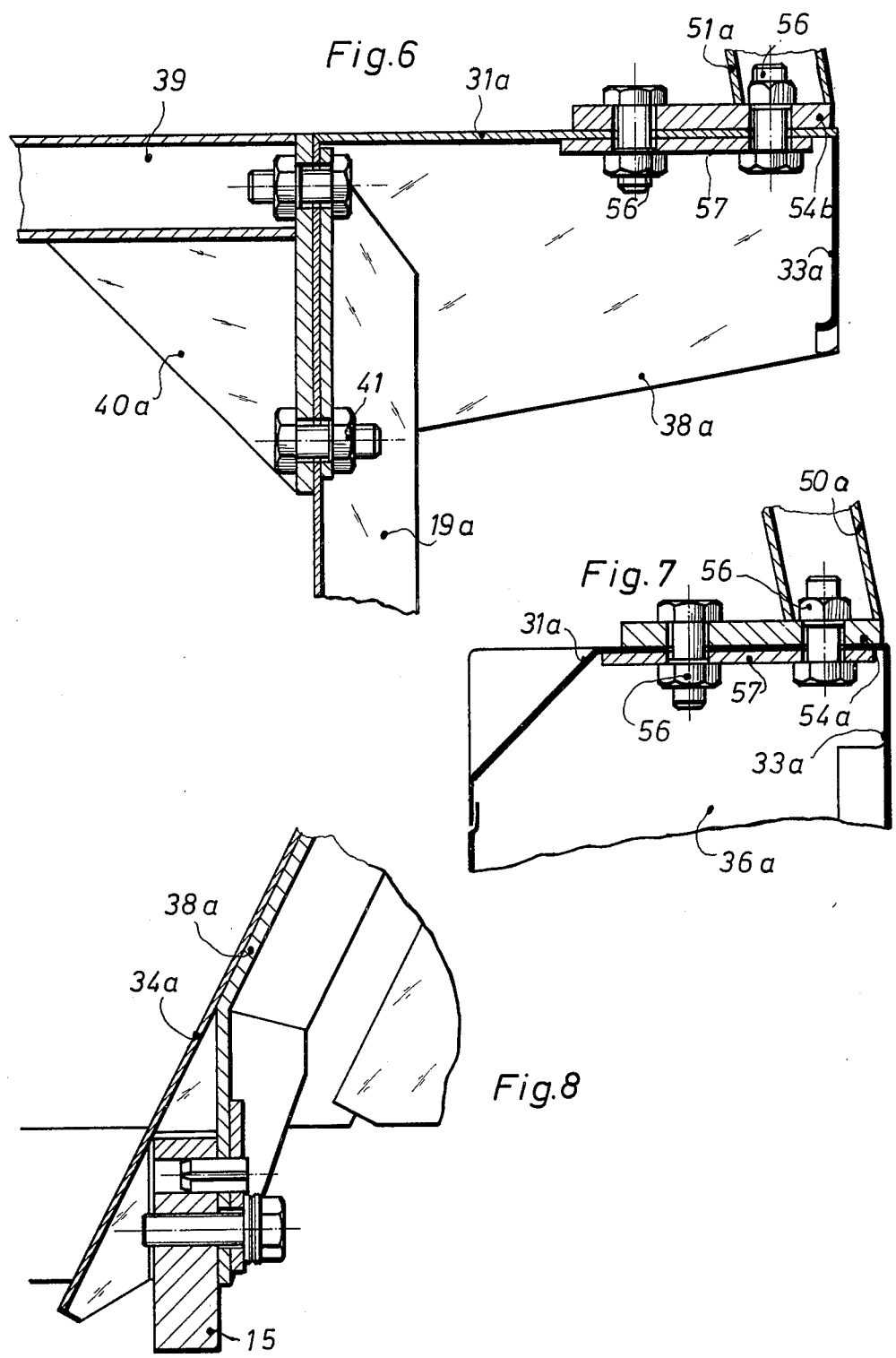

VEHICLE CAB STRUCTURE, ESPECIALLY FOR THE TRACTORS OF THE AGRICULTURAL OR CONSTRUCTION TYPE

The present invention relates to a vehicle cab for tractors, especially for agricultural and/or construction tractors with a lower section or understructure comprising a platform for the driver. Said lower section is connected to the tractor body and the housing for the rear driving axle, preferably through the intervention of elastic means, and serves for holding an upper structure designed as protective device when tilting, said upper structure being provided with a roof which is supported by two front and two rear bend-resistant posts.

A vehicle cab of the above mentioned type has become known according to which the driver's platform is formed by a floor metal sheet in combination with box-shaped longitudinal beams which are arranged on both sides of the tractor body. Said longitudinal beams comprise two rails of a head-shaped cross section and further comprise two vertical plates respectively connected to said rails, and also comprise an angle shaped pressed sheet metal part braced to said plate. Screwed onto said box-shaped longitudinal beams are fenders which cover the two rear driving wheels, said fenders being provided over their total height with reinforcing struts. Furthermore, said box-shaped longitudinal beams and said fenders are at the level of said floor metal sheet provided with vertical surfaces for connecting the front intermediate and rear bend-resistant posts of said roofs provided as protection when the tractor should tilt over. This heretofore known design has the drawback that it requires a great number of parts and from a noise angle does not offer an optimum protection for the driver. This is due to the fact that the driver'platform requires complicated box-shaped beams, that the posts of the roof extend up to the region of the floor metal sheet of the driver's platform, and that the lateral sheet metal parts of said lower section are designed only as cover with numerous cracks. Moreover, there exists the additional drawback that the fenders do not form a supporting element for holding in a safeguarding manner the upper section of the driver's cab. Due to the lateral reinforcing struts extending over the entire height of the fenders, the additional drawback is encountered that the behavior of the driver's cab with regard to its natural vibrations is undesirably altered by soil sticking to the reinforcing struts when driving the tractor over loamy or muddy ground. Finally, a considerable tire wear is caused in an undesired manner by soil collecting on the lateral reinforcing struts of the fenders.

Based on the above outlined findings, it is an object of the present invention to improve a driver's cab of the above mentioned type by structurally simple means so that with an optimum sound insulation by mechanical means an inner chamber is obtained which is free from cracks and also an outer surface between the driving wheels and the cab which is likewise free from cracks while a minimum of additional material is needed, and the production costs will be low.

It is another object of this invention to provide the improvement set forth in the preceding paragraph which will assure that the lower section as well as the upper section of the cab can be produced by itself as structural unit and installed at a reasonable cost.

These and other objects and advantages of the invention will appear more clearly from the following specification in connection with the accompanying drawings, in which:

FIG. 1 diagrammatically illustrates in side view a tractor with a cab according to the invention.

FIG. 6 illustrates a section through the lower portion of the driver's cab according to FIG. 2, said section being taken along the line VI—VI of FIG. 2.

FIG. 7 is a section through the lower portion of the driver's cabin of FIG. 2, said section being taken along the line VII—VII of FIG. 2.

FIG. 8 is a section through the lower portion of the driver's cabin according to FIG. 2, said section being taken along the line VIII—VIII of FIG. 2.

Figure 1:
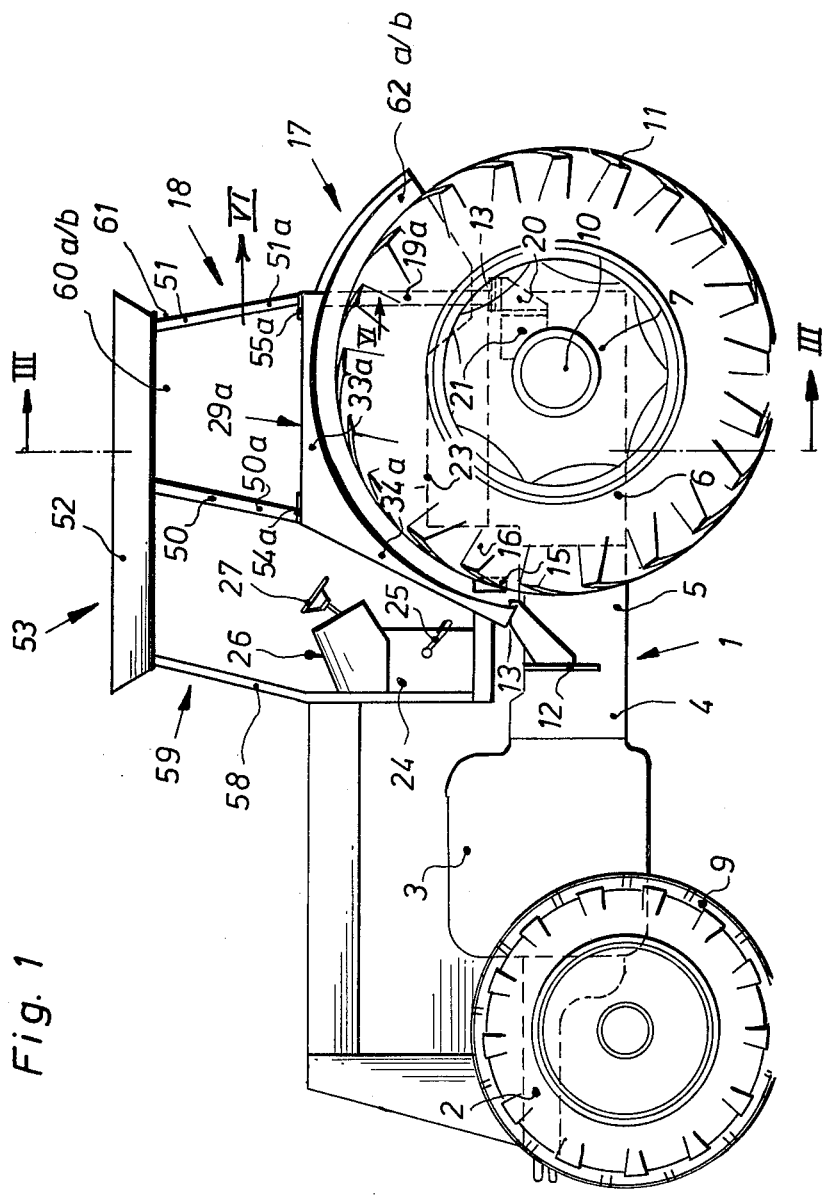
Figure 2:
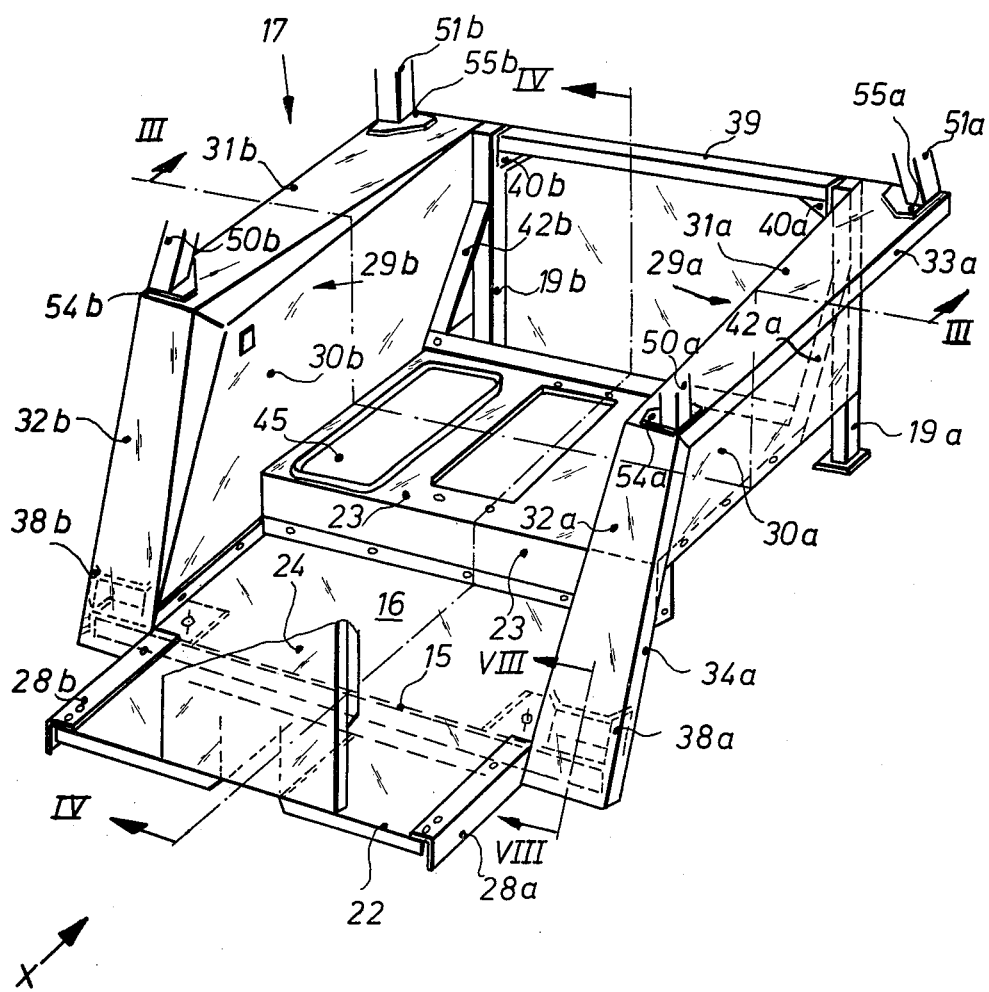
FIG. 2 shows the lower section of the driver's cab according to FIG. 1 in perspective with the driver's seat and support removed.

The vehicle cab according to the present invention is characterized primarily in that the lower section comprises two lateral sections respectively designed as pressed sheet metal parts, each having three sheet metal parts inclined toward each other while the first sheet metal part is about vertical and the second sheet metal part is about horizontal, whereas the third sheet metal part has a surface which is inclined toward the driving axle and forms at least a portion of the entry to the driver's platform and while longitudinal and transverse forces acting upon the roof are substantially absorbed only from the three sheet metal parts of the lateral parts. The vehicle cab according to the invention is furthermore characterized in that the two sheet metal parts of the lateral parts which are inclined to the driving axle are in their lower region bridged by a transverse beam which is connected to the tractor body. The vertical sheet metal part of each lateral part rests through the intervention of a bend-resistant supporting element within the region of the driving axle, whereas the horizontal sheet metal part in this region rests at a rigid angle relative to the supporting member, while the front posts of the roof are supported within the region of the joint or junction of the three sheet metal parts of each lateral part, and while the two rear posts of the roof part are resting within the region of the bend-resistant supporting members on the horizontal sheet metal part of the lower part.

By means of such driver's cab, there will be obtained the great advantage that it will now be possible with thin metal sheets of from 2 mm thickness, by purely mechanical means to obtain an optimum sound insulation while the lower part is self-supporting. Moreover, with this design of the driver's cab according to the invention, reinforcing struts for the fenders over the total height thereof in the space between the vertical sheet metal part and the driving wheels will be superfluous. In addition thereto, a particularly simple and economical production is obtained while an easy assembly is assured.

According to a further development of the invention, for obtaining a particularly high transverse rigidity of the lower part and thereby the entire cab, it is provided that the bend-resistant supporting members are within the region of the driving axle in a manner resistant against angular changes connected to each other by a horizontal transverse beam. For purposes of simplifying the assembly and stock keeping, it is expedient in this connection that the horizontal transverse beam is detachably connected to each of the two bend-resistant supporting members and/or side parts.

According to the present invention, for economically mounting the lower part on the front driving axle or cluth housing it is provided that the lower transverse beam consists of a beam which is connected to the floor metal sheets and the side metal sheets which last mentioned beam is on both sides directly or indirectly connected to the body of the tractor.

For purposes of economically and elastically mounting the lower part on the body of the tractor, it is in conformity with the present invention provided that the bend-resistant supporting members rest directly or indirectly on the driving axle through one elastic means each, preferably provided with a pivot bearing, and that the lower transverse beam is through an elastic means directly or indirectly detachably connected to the body of the tractor. For purposes of forming a lower section which is simple in production, it is suggested according to the invention that the two lateral parts between the lower transverse beams and the two rear bend-resistant supporting members with their lower edges are bridged by a floor metal sheet which has an angular longitudinal cross section and is bend-resistant, said floor metal sheet forming a part of the driver's platform is composed of a plurality of parts screwed to each other.

For purposes of creating the lower section which is to be detachable by itself without the platform part which receives the steering and operating device, and which is to be pivotally connected to the body of the tractor, it is provided according to a further development of the invention that the driver's platform comprises a part for supporting a steering and operating device which is detachably connected to the lower transverse beam and/or the adjacent floor metal sheet. In this way, a particularly economical and easy assembly is obtained by that part of the driver's platform which is intended for holding the steering and operating device, comprising a floor metal sheet which is adpated selectively when removing the lower section to be braced to one angular part or the like each which is to be connected to the body of the tractor.

For purposes of stiffening the lower section within the region of the floor metal sheet, it is, according to still another development of the invention, provided that the floor metal sheet with its end portion which faces the bend-resistant supporting members is connected to the upper part of the bend-resistant supporting members through the intervention of lateral supporting elements supporting, preferably angular, elements which are connected to the vertical metal sheet part of the lateral parts.

If below the driver's platform control members for auxiliary devices of the tractor are provided it is, according to a further development of the invention, provided that the ground metal sheet has a window-shaped recess, and that within this recess there are mounted on a support or the like the actuating elements for the control members. In this connection, it is particularly advantageous when the support or the like intended for the mounting of the actuating members is directly or indirectly through a sleeve connected to the floor metal sheet.

For purposes of widening the metal sheet parts which cover the driving wheels, it is suggested according to the invention that the bend-resistant supporting members and/or the thereby stiffened metal sheet parts of the two lateral parts and/or the horizontal sheet metal parts serve as holding means for fenders disengageably connected to said sheet metal parts. In this connection, it is expedient that the horizontal sheet metal parts of the lateral parts and the sheet metal parts inclined to the driving axle have that end thereof which faces away from the vertical sheet metal part rounded off or chamferred.

Finally, according to the invention, it is also provided that the horizontal sheet metal part and the sheet metal part of each lateral part which is inclined toward the driving axle are within the region of its joint or junction angle stiffened by a horizontal strut with the vertical sheet metal part.

Referring now to the drawings in detail, the body 1 of a tractor is composed primarily of a front axle support 2, an internal combustion engine 3 flanged to said support 2, a clutch housing 4 connected to said internal combustion engine 3, and a transmission housing 5 as well as an axle housing 6 braced to said transmission housing 5. Driving axle housings 7 are respectively screwed to both sides of the axle housing 6. The front axle 8 of the tractor has associated therewith wheels 9 while the rear driving sections 10 of the latter respectively have associated therewith a driving wheel 11. Consoles 12 are respectively flanged to both sides of the clutch housing 4. These consoles 12 are respectively connected to bearings 14 of a front transverse beam 15 through the intervention of a rubber-metal-connection 13 with a mechanical safety device against breakage.

The transverse beam 15 is firmly braced to an intermediate floor metal sheet 16 of a lower section 17 of a driver's cabin 18. The driver's cabin 18 has its lower section 17 on the rear side respectively supported by consoles 20 through the intervention of one bend-resistant supporting member 19a, 19b through the inter-position of a rubber-metal element 13 likewise provided with a safety device against breakage. The two consoles 20 are through holding means 21 respectively braced to associated driving axle housings 7.

The lower section 17 in addition to the intermediate ground plate 16 has a front floor metal sheet 22 braced at the end face to said sheet 16, and also has a floor metal sheet 23 which at its rear end is angled off and which is likewise at its end face screwed to the floor metal sheet 16 and laterally is screwed to the angle-shaped links 28a/b. Said links are at their end connected to the transverse beam 15 and the floor plate 16 by welding or by screw bolts. The front floor plate 20 serves as support for a front control console 24 which serves as mount for pedals 25 and actuating levers 26 and also for holding the primary part of a hydrostatic steering device with steering wheel 27. For disassembling the lower part 17 without the front control console 24, from the body of the tractor, the front floor metal sheet 22 is detached from the intermediate floor metal sheet 16 and the angle-shaped links 28a/b while previously the floor metal sheet 22 is adapted by means of angular links (not illustrated) located on both sides of sheet 22 to be screwed directly and in an auxiliary manner to the body 1 of the tractor.

Furthermore, the third sheet metal part is relative to the first and second sheet metal part 30a/b; 31a/b of each lateral part 29a; 29b respectively designed as a sheet metal part 32a; 32b which has its surface inclined to the driving axle housings 7. The two sheet metal parts 32a/32b simultaneously form the entry section to the driver's platform illustrated by the floor metal sheets 16, 22 and 33. Each horizontal sheet metal part 31a/b and each sheet metal part 32a/b inclined toward the driving wheel housings 7 has its outside provided with a bevel or chamfer 33a/b and 34a/b. The bevels or chamfers 33a/b and 34a/b will in case of need serve for holding lateral fender segments 35a; 35b more particularly illustrated in FIG. 3. These fender segments are by non-illustrated screws braced with the bevels or chamfers 33a/b.

Within the region of the joint or junction of each of the three sheet metal parts 30a/b; 31a/b and 32a/b, said sheet metal parts are, as shown in FIG. 7, in case of need additionally stiffened by means of a web 35a/35b which as to its height corresponds approximately to the height of the bevels 33a/b; 34a/b. Moreover, as will be seen from FIG. 8, the sheet metal parts 34a/b inclined toward the driving axle housing 7 are connected to the transverse beam 15 through the intervention of an angled-off web sheet 37a;37b angled off on both sides. As will likewise be seen from FIG. 3, each horizontal sheet metal part 31a;31b is at the level of the supporting members 19a;19b stiffened relative to the vertical sheet metal part 30a;30b by means of a web 38a;38b, the height of which corresponds to the bevel 33a;33b. Furthermore, the two supporting members 19a/b are stiffened by end angles 40a;40b through the intervention of a transverse beam 39 which is detachably connected to the supporting members 19a/b. These end angles 40a; 40b are preferably by means of screws 41 screwed onto the supporting members 19a/b. Moreover, the two lateral parts 29a/29b are on those sides thereof which are located inside the cabin chamber stiffened relative to each other by means of angle-shaped supporting members 42a;42b. These angle-shaped supporting members are arranged substantially parallel to the inclined sheet metal parts 32a/b. The supporting members 42a/b are preferably screwed to the supporting members 19a/b and to the rear floor metal sheet 23. Furthermore, the two supporting members 42a/b serve for holding a rear metal sheet adapted selectively to be mounted or for a flap on the rear side which sheet and flap are provided with or without openings.

Figure 3:
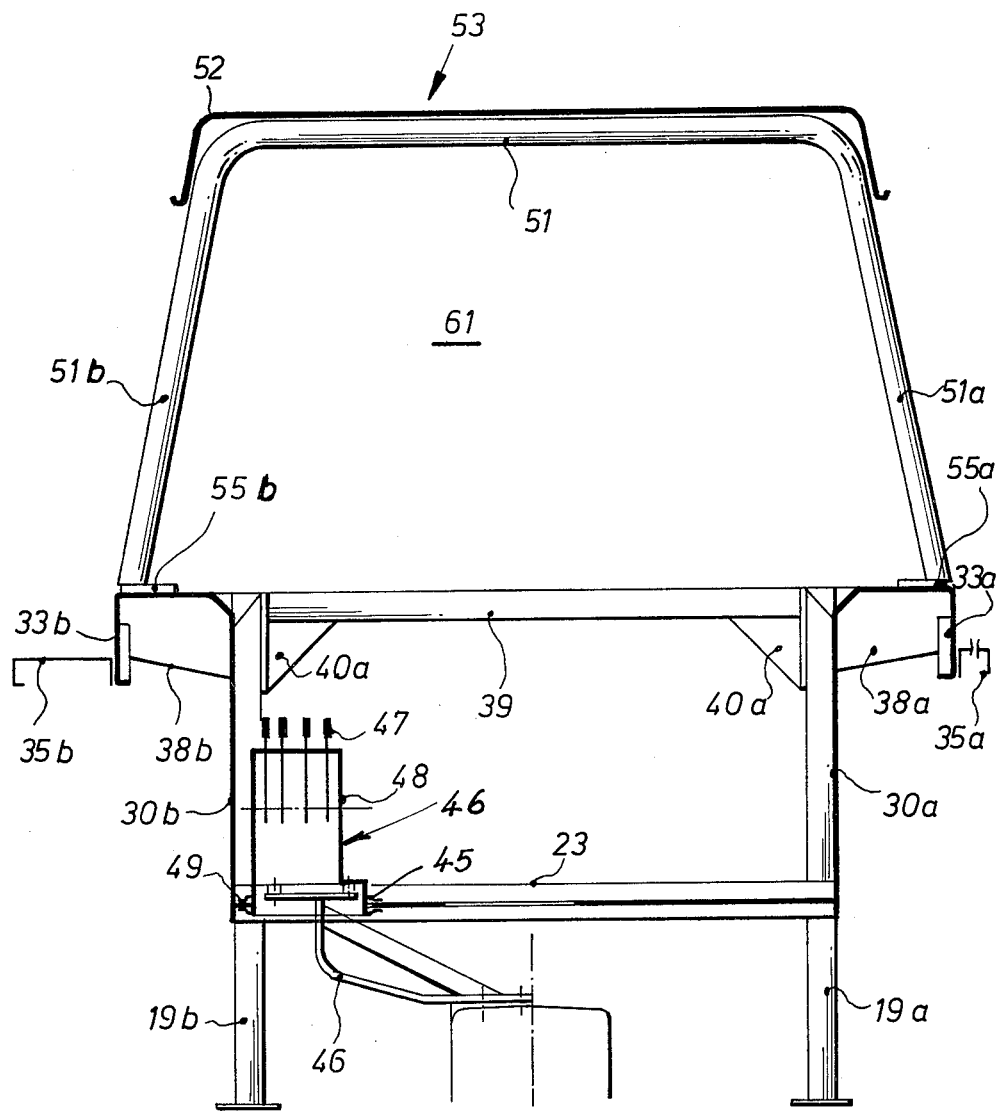
FIG. 3 is a cross section taken along the line III—III of FIGS. 1 and 2 through the driver's cab laterally screwed on fender segments.
Figure 4:
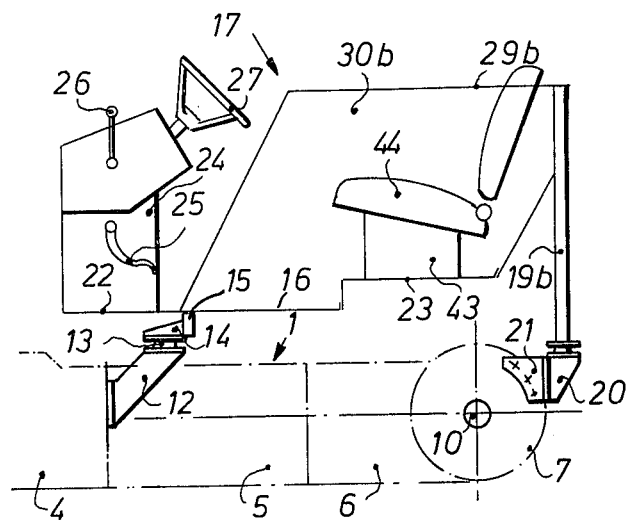
FIG. 4 represents a longitudinal section along the line IV—IV of FIG. 2 through the lower section of the driver's cab.
Figure 5:
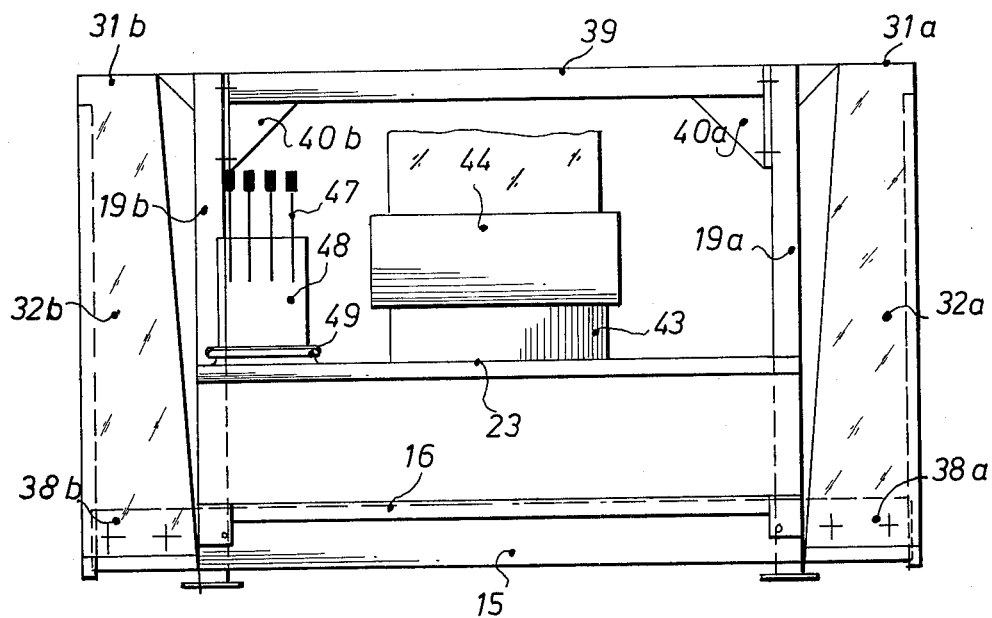
FIG. 5 shows a front view of the lower section of the driver's cab, said view being taken in the direction of the arrow X of FIG. 2 while the operating support has been removed.

The rear floor sheet 23 furthermore serves as holding means for a driver's seat 44 which is longitudinally displaceable and is adjustable as to height on a console 43. Adjacent the driver's seat 44, there is in the rear floor metal sheet provided a hatch 45 into which extends a console 46 as shown in FIG. 3. This console 46 serves as mount for actuating severs 47 which serve for controlling a hydraulic power lift and/or other controlling devices of the tractor. The levers 47 are guided and mounted in a coulisse-shaped part 48 and are connected to the associated control devices by means of non-illustrated linkage members. For purposes of sound absorption and insulating the driver's stand of the driver's cabin against the entry of soil, the floor metal sheet 23 is connected to a fold cover 49 which surrounds the hatch 45 and which is likewise connected to the coulisse-shaped cover 48.

The lower section 17 of the driver's stand 18 furthermore serves as holding means for an upper part 53 of the driver's cabin which upper part comprises a rear and front overroll yoke 50; 51 in connection with a roof 52. The vertical legs of the yokes 50,51 which respectively are designed as posts 50a/50b; 51a/51b are at their lower side provided with a flange-shaped portion 54a/b; 55a/b which by means of screws 56 as shown in FIGS. 6 and 7 screwed onto the lateral parts 29a;29b while simultaneously a tightening plate 57 is located below the horizontal sheet metal part 31a;31b. At the front side, the roof section 52 of the driver's cabin is through a U-shaped yoke 58 connected to the driver's platform which is substantially formed by the lower section 17. The yoke 58 surrounds the front operating console 24 and simultaneously serves as holding means of a front disc 59. Parallel thereto, the two overall yokes 50,51 serve as holding means for a lateral disc 60a,60b. The rear overroll yoke 51 is furthermore provided as holding means for a rear disc 61. Furthermore, the two legs of the U-shaped yoke 58 are intended to serve as holding means for non-illustrated lateral doors, the locking means for which are provided on the posts 50a/b. For supplementing the driver's cabin according to the invention, each vehicle side is provided with a fender segment 62a/b. The fender segments 62a;62b are respectively connected to the web 38a;38b and the supporting members 19a;19b.

It is, of course, to be understood that the present invention is, by no means, limited to the specific showing in the drawings, but also comprises any modifications within the scope of the appended claims.

What is claimed is:

1. A vehicle cab structure, especially for mounting on the frame of an agricultural or a construction tractor, and having a roof section and a lower section respectively forming a side wall also forming a fender which takes up supporting forces effective parallel to the wall and posts extending in the up and down direction between said sections, said cab structure comprising in combination: a pair of laterally spaced members forming a portion of said lower section and each comprising a generally vertical metal panel, a horizontal panel connected to and extending outwardly from the upper edge of each vertical panel, and an inclined, transversely extending front panel having the inner edge connected to the forward edge of said vertical panel and the top edge connected to the forward edge of said horizontal panel and reinforcing the forward end of said horizontal panel against deflection, a transverse beam interconnecting the lower ends of said front panels, means connecting said beam to the tractor frame, upstanding bend resistant brace elements connected to the rear edges of said vertical panels and near the rear axle of the tractor when the cab structure is mounted thereon, and means connected to said brace elements and to the rearward ends of said horizontal panels to brace at least the rearward ends of the latter against deflection, the posts extending between the roof section and the lower section engaging said horizontal panel near the forward and rearward ends respectively of said horizontal panels.

2. A vehicle cab structure according to claim 1, wherein said inclined panel takes up forces parallel to the side wall thereof.

3. A vehicle structure according to claim 1, wherein both laterally spaced members between the lower transverse beam and both rear edges are bridged by a stiff bottom plate having an angular step.

4. A vehicle cab structure especially for mounting on the frame of an agricultural or a construction tractor, and having a roof section and a lower section and posts extending in the up and down direction between said sections, said cab structure comprising: a pair of laterally spaced members forming a portion of said lower section and each comprising a generally vertical metal panel, a horizontal panel connected to and extending outwardly from the upper edge of each vertical panel, and an inclined, transversely extending front panel having the inner edge connected to the forward edge of said vertical panel and the top edge connected to the forward edge of said horizontal panel and reinforcing the forward end of said horizontal panel against deflection, a transverse beam interconnecting the lower ends of said front panels, means connecting said beam to the tractor frame, upstanding bend resistant brace elements connected to the rear edges of said vertical panels and near the rear axle of the tractor when the cab structure is mounted thereon, and means connected to said brace elements and to the rearward ends of said horizontal panels to brace at least the rearward ends of the latter against deflection, the posts extending between the roof section and the lower section engaging said horizontal panel near the forward and rearward ends respectively of said horizontal panels, and a beam element extending transversely between and interconnecting the upper ends of said brace elements.

5. A vehicle cab structure according to claim 4 in which said beam element is detachably connected to said brace elements.

6. A vehicle cab structure especially for mounting on the frame of an agricultural or a construction tractor, and having a roof section and a lower section and posts extending in the up and down direction between said sections, said cab structure comprising: a pair of laterally spaced members forming a portion of said lower section and each comprising a generally vertical metal panel, a horizontal panel connected to and extending outwardly from the upper edge of each vertical panel, and an inclined, transversely extending front panel having the inner edge connected to the forward edge of said vertical panel and the top edge connected to the forward edge of said horizontal panel and reinforcing the forward end of said horizontal panel against deflection, a transverse beam interconnecting the lower ends of said front panels, means connecting said beam to the tractor frame, upstanding bend resistant brace elements connected to the rear edges of said vertical panels and near the rear axle of the tractor when the cab structure is mounted thereon, and means connected to said brace elements and to the rearward ends of said horizontal panels to brace at least the rearward ends of the latter against deflection, the posts extending between the roof section and the lower section engaging said horizontal panel near the forward and rearward ends respectively of said horizontal panels, and a horizontal floor sheet extending between the lower edges of said vertical panels, said transverse beam being connected to the underneath side of said floor sheet as well as to the tractor frame.

7. A vehicle cab structure according to claim 6 in which said floor sheet is stiff against bending and has an angular step formed therein between the front and back edges and bridges between the lower edges of said vertical panels.

8. A vehicle cab structure according to claim 7 in which said floor sheet is formed of a plurality of parts secured together by removable fasteners.

9. A vehicle cab structure according to claim 6 which includes means for receiving operative and control components of said tractor mounted on the forward end of said floor sheet and detachably connected to at least one of said transverse beam and said floor sheet.

10. A vehicle cab structure according to claim 9 which includes stiffening members extending in the fore and aft direction and connected to the side edges of the forward part of said floor sheet and to the tractor frame.

11. A vehicle cab structure according to claim 6 in which angular brace members are provided extending between the forward sides of said brace elements and the sides of said floor sheet at points thereon spaced forwardly from said brace elements.

12. A vehicle cab structure according to claim 6 in which said floor sheet includes an aperture therein, and a console member in said aperture having actuating elements mounted thereon.

13. A vehicle cab structure according to claim 12 which includes a ring-like connector element supportingly connecting said console to the floor sheet at the margin of said aperture.

14. A vehicle cab structure, especially for mounting on the frame of an agricultural or a construction tractor, and having a roof section and a lower section and posts extending in the up and down direction between said sections, said cab structure comprising: a pair of laterally spaced members forming a portion of said lower section and each comprising a generally vertical metal panel, a horizontal panel connected to and extending outwardly from the upper edge of each vertical panel, and an inclined, transversely extending front panel having the inner edge connected to the forward edge of said vertical panel and the top edge connected to the forward edge of said horizontal panel and reinforcing the forward end of said horizontal panel against deflection, a transverse beam interconnecting the lower ends of said front panels, means connecting said beam to the tractor frame, upstanding bend resistant brace elements connected to the rear edges of said vertical panels and near the rear axle of the tractor when the cab structure is mounted thereon, and means connected to said brace elements and to the rearward ends of said horizontal panels to brace at least the rearward ends of the latter against deflection, the posts extending between the roof section and the lower section engaging said horizontal panel near the forward and rearward ends respectively of said horizontal panels, said brace elements extending downwardly to near the rear axle of the tractor, and swivel means connecting the lower ends of said brace elements to the rear axle of the tractor and also forming the means connecting said transverse beam to the tractor frame.

15. A vehicle cab structure, especially for mounting on the frame of an agricultural or a construction tractor, and having a roof section and a lower section and posts extending in the up and down direction between said sections, said cab structure comprising: a pair of laterally spaced members forming a portion of said lower section and each comprising a generally vertical metal panel, a horizontal panel connected to and extending outwardly from the upper edge of each vertical panel, and an inclined, transversely extending front panel having the inner edge connected to the forward edge of said vertical panel and the top edge connected to the forward edge of said horizontal panel and reinforcing the forward end of said horizontal panel against deflection, a transverse beam interconnecting the lower ends of said front panels, means connecting said beam to the tractor frame, upstanding bend resistant brace elements connected to the rear edges of said vertical panels and near the rear axle of the tractor when the cab structure is mounted thereon, and means connected to said brace elements and to the rearward ends of said horizontal panels to brace at least the rearward ends of the latter against deflection, the posts extending between the roof section and the lower section engaging said horizontal panel near the forward and rearward ends respectively of said horizontal panels, fender elements for the rear wheels of the tractor, and at least one of said vertical panels and said brace elements and said horizontal panels being connected to and supporting said fenders.

16. A vehicle cab structure, especially for mounting on the frame of an agricultural or a construction tractor, and having a roof section and a lower section and posts extending in the up and down direction between said sections, said cab structure comprising: a pair of laterally spaced members forming a portion of said lower section and each comprising a generally vertical metal panel, a horizontal panel connected to and extending outwardly from the upper edge of each vertical panel, and an inclined, transversely extending front panel having the inner edge connected to the forward edge of said vertical panel and the top edge connected to the forward edge of said horizontal panel and reinforcing the forward end of said horizontal panel against deflection, a transverse beam interconnecting the lower ends of said front panels, means connecting said beam to the tractor frame, upstanding bend resistant brace elements connected to the rear edges of said vertical panels and near the rear axle of the tractor when the cab structure is mounted thereon, and means connected to said brace elements and to the rearward ends of said horizontal panels to brace at least the rearward ends of the latter against deflection, the posts extending between the roof section and the lower section engaging said horizontal panel near the forward and rearward ends respectively of said horizontal panels, the outer edges of said horizontal and front panels being provided with stiffening flanges disposed in vertical planes.

17. A vehicle cab structure according to claim 16 in which said fenders engage and are connected to the said flanges.

18. A vehicle cab structure especially for mounting on the frame of an agricultural or a construction tractor, and having a roof section and a lower section and posts extending in the up and down direction between said sections, said cab structure comprising: a pair of laterally spaced members forming a portion of said lower section and each comprising a generally vertical metal panel, a horizontal panel connected to and extending outwardly from the upper edge of each vertical panel, and an inclined, transversely extending front panel having the inner edge connected to the forward edge of said vertical panel and the top edge connected to the forward edge of said horizontal panel and reinforcing the forward end of said horizontal panel against deflection, a transverse beam interconnecting the lower ends of said front panels, means connecting said beam to the tractor frame, upstanding bend resistant brace elements connected to the rear edges of said vertical panels and near the rear axle of the tractor when the cab structure is mounted thereon, and means connected to said brace elements and to the rearward ends of said horizontal panels to brace at least the rearward ends of the latter against deflection, the posts extending between the roof section and the lower section engaging said horizontal panel near the forward and rearward ends respectively of said horizontal panels, and a box-like console supportingly engaging said panels near the juncture of said front and horizontal panels.

19. A vehicle cab structure especially for mounting on the frame of an agricultural or a construction tractor, and having a roof section and a lower section and posts extending in the up and down direction between said sections, said cab structure comprising: a pair of laterally spaced members forming a portion of said lower section and each comprising a generally vertical metal panel, a horizontal panel connected to and extending outwardly from the upper edge of each vertical panel, and an inclined, transversely extending front panel having the inner edge connected to the forward edge of said vertical panel and the top edge connected to the forward edge of said horizontal panel and reinforcing the forward end of said horizontal panel against deflection, a transverse beam interconnecting the lower ends of said front panels, means connecting said beam to the tractor frame, upstanding bend resistant brace elements connected to the rear edges of said vertical panels and near the rear axle of the tractor when the cab structure is mounted thereon, and means connected to said brace elements and to the rearward ends of said horizontal panels to brace at least the rearward ends of the latter against deflection, the posts extending between the roof section and the lower section engaging said horizontal panel near the forward and rearward ends respectively of said horizontal panels, and panel portions inclined to the principal planes of said panels and adjacent the regions of interconnection of said panels.

* * * * *